United States Patent
Dalmatov et al.

(10) Patent No.: US 11,340,814 B1
(45) Date of Patent: May 24, 2022

(54) PLACING DATA IN A DATA STORAGE ARRAY BASED ON DETECTION OF DIFFERENT DATA STREAMS WITHIN AN INCOMING FLOW OF DATA

(71) Applicant: EMC IP Holding Company LLC, Hopkinton, MA (US)

(72) Inventors: Nickolay Alexandrovich Dalmatov, Saint Petersburg (RU); Richard P. Ruef, Santa Cruz, CA (US); Kurt W. Everson, Missouri City, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 855 days.

(21) Appl. No.: 15/498,653

(22) Filed: Apr. 27, 2017

(51) Int. Cl.
*G06F 3/06* (2006.01)
*G06F 12/02* (2006.01)

(52) U.S. Cl.
CPC .......... *G06F 3/0644* (2013.01); *G06F 3/0604* (2013.01); *G06F 3/0631* (2013.01); *G06F 3/0653* (2013.01); *G06F 3/0673* (2013.01); *G06F 3/0683* (2013.01); *G06F 3/0685* (2013.01); *G06F 3/0688* (2013.01); *G06F 3/0689* (2013.01); *G06F 12/0253* (2013.01); *G06F 2212/1044* (2013.01)

(58) Field of Classification Search
CPC .... G06F 3/0604; G06F 3/0631; G06F 3/0644; G06F 3/0653; G06F 3/0673; G06F 3/0683; G06F 3/0685; G06F 3/0688; G06F 3/0689; G06F 12/0253; G06F 2212/1044
See application file for complete search history.

(56) References Cited

U.S. PATENT DOCUMENTS

| 6,301,614 B1 * | 10/2001 | Najork ............. G06F 17/30902 707/999.003 |
| 6,721,823 B2 * | 4/2004 | Araki .................... G06F 9/5016 710/36 |
| 7,140,008 B2 | 11/2006 | Chilimbi et al. |
| 7,383,483 B2 | 6/2008 | Biran et al. |
| 7,441,006 B2 | 10/2008 | Biran et al. |
| 7,912,979 B2 | 3/2011 | Biran et al. |

(Continued)

OTHER PUBLICATIONS

Aurora: a new model and architecture for data stream management by Abadi (Year: 2003).*

*Primary Examiner* — Paul M Knight
(74) *Attorney, Agent, or Firm* — BainwoodHuang

(57) ABSTRACT

A technique performs stream-based storage of data. The technique involves receiving, by processing circuitry of data storage equipment, an incoming flow of data. The technique further involves detecting, by the processing circuitry, different data streams within the incoming flow of data. The technique further involves performing, by the processing circuitry, data placement operations based on the different data streams detected within the incoming flow of data. The data placement operations are configured and operative to place data of each data stream of the different data streams in a different segment of storage provided by a data storage array of the data storage equipment. With data of each data stream being placed in a different segment, the resulting operation is more efficient, e.g., optimized sequential reads and writes, more effective data prefetching, more effective auto-tiering of data, and so on.

17 Claims, 6 Drawing Sheets

(56) References Cited

U.S. PATENT DOCUMENTS

| | | | |
|---|---|---|---|
| 8,006,169 B2 | 8/2011 | Biran et al. | |
| 8,230,189 B1* | 7/2012 | Nagarkar | G06F 11/1464 |
| | | | 711/114 |
| 8,880,788 B1* | 11/2014 | Sundaram | G06F 3/0688 |
| | | | 711/103 |
| 9,317,377 B1* | 4/2016 | Wu | G06F 11/1469 |
| 9,442,854 B2 | 9/2016 | Hyde et al. | |
| 9,766,823 B2* | 9/2017 | Mylly | G06F 3/0644 |
| 9,864,529 B1* | 1/2018 | Chen | G06F 3/0619 |
| 2003/0221054 A1* | 11/2003 | Wu | G06F 3/0601 |
| | | | 711/112 |
| 2011/0191556 A1* | 8/2011 | Anderson | G06F 3/0613 |
| | | | 711/162 |
| 2011/0246821 A1* | 10/2011 | Eleftheriou | G06F 11/2087 |
| | | | 714/15 |
| 2012/0137059 A1* | 5/2012 | Yang | G06F 3/0611 |
| | | | 711/104 |
| 2014/0143255 A1* | 5/2014 | Konig | G06F 17/30598 |
| | | | 707/740 |
| 2015/0169237 A1* | 6/2015 | Ioannou | G06F 3/0679 |
| | | | 711/103 |
| 2015/0193170 A1* | 7/2015 | Sundaram | G06F 3/0641 |
| | | | 711/103 |
| 2016/0253257 A1* | 9/2016 | Kim | G06F 12/0253 |
| | | | 711/166 |
| 2017/0235646 A1* | 8/2017 | Bhagat | G06F 11/1464 |
| | | | 711/138 |
| 2018/0034715 A1* | 2/2018 | Nagaraju | H04L 43/028 |

* cited by examiner

PLACING DATA IN A DATA STORAGE ARRAY BASED ON DETECTION OF DIFFERENT DATA STREAMS WITHIN AN INCOMING FLOW OF DATA

BACKGROUND

A conventional data storage system processes input/output (I/O) requests from one or more external host computers. In particular, the conventional data storage system writes host data to and reads host data from an array of storage drives.

For example, a human operator may run accounting software to generate and store an accounting report on the array. Concurrently, a different human operator may use word processing software to edit a document that is stored on the array.

SUMMARY

It should be understood that there are deficiencies to the above-described conventional data storage system. For example, the accounting report generated by the accounting software and the document provided by the word processing software are unrelated to each other. Moreover, it may only be coincidental if the accounting report and the document are accessed at the same time in the future. Nevertheless, the above-described conventional data storage system will likely store accounting report and the document together in the array (e.g., within the same segment, etc.) if the system receives the data from both sources at the same time. Furthermore, if a garbage collection service runs on the system, the garbage collection service may further mix the data of the accounting report and the document together on the system.

Unfortunately, such mixing of data from different sources may lead to suboptimal operation of the system. Along these lines, the data for the accounting report may be more fragmented and thus read less sequentially due to intermixing with the document data and vice versa. Additionally, such fragmenting and intermixing may cause write amplification on solid state drives (SSDs).

In contrast to the above-described conventional data storage system which may mix together data from different sources, improved techniques are directed to stream-based storage of data in which data placement operations are performed based on detection of different data streams within an incoming flow of data. Such operation enables the data of each data stream to be placed in a different segment of storage provided by a data storage array (e.g., where each segment is formed by multiple storage devices). Since the data from each source is kept together, the resulting operation is more efficient, e.g., optimized sequential reads and writes, improved data prefetching, improved auto-tiering of data, and so on.

One embodiment is directed to a method of performing stream-based storage of data. The method includes receiving, by processing circuitry of the data storage equipment, an incoming flow of data. The method further includes detecting, by the processing circuitry, different data streams within the incoming flow of data. The method further includes performing, by the processing circuitry, data placement operations based on the different data streams detected within the incoming flow of data. The data placement operations are configured and operative to place data of each data stream of the different data streams in a different segment of storage provided by a data storage array of the data storage equipment.

In some arrangements, detecting the different data streams within the incoming flow of data includes evaluating the incoming flow of data and, based on a result of evaluating the incoming flow of data, identifying existence of multiple data stream sources that provide the different data streams. In particular, logic is able to identify different streams (e.g., separate flows, sub-streams, etc.) from different sources, and then group the data (e.g., blocks) from the same stream together for placement within the data storage array.

In some arrangements, performing the data placement operations includes placing the data of a first data stream in a first segment of storage, and the data of a second data stream in a second segment of storage that is different from the first segment of storage. Such operation may be expanded to one or more additional streams, e.g., placing the data of a third data stream in a third segment of storage, and so on.

In some arrangements, the method further includes, prior to performing the data placement operations, forming the first segment of storage and the second segment of storage from the data storage array. Here, each segment of storage may be formed from multiple storage devices of the data storage array.

In certain arrangements, the data storage equipment is constructed and arranged to store host data on behalf of a set of host computers. In these arrangements, identifying the existence of the multiple data stream sources may include identifying a first host computer application running on the set of host computers as a data stream source that provides the first data stream, and a second host computer application running on the set of host computers as a data stream source that provides the second data stream. Additionally, in some arrangements, identifying the existence of the multiple data stream sources may include identifying a first user of the set of host computers as a data stream source that provides the first data stream, and a second user of the set of host computers as a data stream source that provides the second data stream. Furthermore, in some arrangements, identifying the existence of the multiple data stream sources may include identifying a first data stream source and a second data stream source which is different from the first data stream source based on communications between the data storage equipment and the set of host computers.

In some arrangements, the method further includes generating first digests as at least some of the data of the first data stream, and second digests as at least some of the data of the second data stream. In these arrangements, the first digests may be placed in the first segment of storage, and the second digests may be placed in the second segment of storage. Additionally, the first digests and the second digests may uniquely identify respective blocks of data for deduplication.

In some arrangements, placing the data of the first data stream and the second data stream includes separating the incoming flow of data into the first data stream and the second data stream, and performing inline data placement that places the first data stream in the first segment of storage and the second data stream in the second segment of storage. Here, each segment of storage may be formed from multiple storage devices of the data storage array.

In some arrangements, placing the data of the first data stream and the second data stream includes storing, as the incoming flow of data, aggregated data within the data storage array, the aggregated data including the data of the first data stream and the data of the second data stream intermixed with each other. In these arrangements, placing the data may further include performing background data placement that reads the aggregated data from the data storage array, separates the data of first data stream and the data of the second data stream from the aggregated data read from the data storage array, and places the data of the first data stream in the first segment of storage and the data of the second data stream in the second segment of storage. Again, each segment of storage may be formed from multiple storage devices of the data storage array.

In some arrangements, the data of the first data stream is placed in the first segment of storage and the data of the second data stream is placed in the second segment of storage during a first time period. In these arrangements, the method may further include, during a second time period after the first time period, providing a garbage collection service that (i) combines valid data of the first data stream together and re-places the valid data of the first data stream in the data storage array, and (ii) combines valid data of the second data stream together and re-places the valid data of the second data stream in the data storage array. Here, the re-placed valid data of the first data stream and the re-placed valid data of the second data stream may reside in different segments of storage formed from the multiple storage devices of the data storage array.

In some arrangements, the method further includes, during a third time period after the second time period, providing the garbage collection service which then combines remaining valid data of the first data stream and remaining valid data of the second data stream together and re-places the remaining valid data of the first data stream and the remaining valid data of the second data stream in the data storage array. In such arrangements, at least some of the remaining valid data of the first data stream and at least some of the remaining valid data of the second data stream may reside together in a common segment of the data storage array.

In some arrangements, the method further includes, after the data of the first data stream is placed in the first segment of storage and the data of the second data stream is placed in the second segment of storage, waiting for a predefined amount of time to expire and, after the predefined amount of time has expired, providing a garbage collection service that combines remaining valid data of the first data stream and remaining valid data of the second data stream together and re-places the remaining valid data of the first data stream and the remaining valid data of the second data stream in the data storage array. In these arrangements, at least some of the remaining valid data of the first data stream and at least some of the remaining valid data of the second data stream may reside together in a common segment of the data storage array.

In some arrangements, the method further includes, while performing the data placement operations that place the data of the first data stream in the first segment of storage and the data of the second data stream in the second segment of storage, storing addresses for the data of the first data stream and the data of the second data stream in records of a log. In these arrangements, the records may be stored in temporal order to indicate relative data arrival time.

In some arrangements, the method further includes providing a garbage collection service that combines remaining valid data of the first data stream together and remaining valid data of the second data stream together based on the records in the log that are stored in temporal order. It should be understood that the garbage collection service may distinguish the first data stream from the second data stream based on a set of stream identifiers, as well as use the set of stream identifiers to store the first data stream and the second data stream in a set of multi-stream write technology solid state drives equipped with multi-stream write technology.

Another embodiment is directed to data storage equipment which includes a communications interface, memory, and control circuitry coupled to the communications interface and the memory. The memory stores instructions which, when carried out by the control circuitry, cause the control circuitry to:

(A) receive an incoming flow of data,
(B) detect different data streams within the incoming flow of data, and
(C) perform data placement operations through the communications interface based on the different data streams detected within the incoming flow of data, the data placement operations being configured and operative to place data of each data stream of the different data streams in a different segment of storage provided by a data storage array.

Yet another embodiment is directed to a computer program product having a non-transitory computer readable medium which stores a set of instructions to perform stream-based storage of data. The set of instructions, when carried out by computerized circuitry, cause the computerized circuitry to perform a method of:

(A) receiving an incoming flow of data;
(B) detecting different data streams within the incoming flow of data; and
(C) performing data placement operations based on the different data streams detected within the incoming flow of data, the data placement operations being configured and operative to place data of each data stream of the different data streams in a different segment of storage provided by a data storage array of data storage equipment.

It should be understood that, in the cloud context, at least some of electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in placing data based on detection of different data streams within an incoming flow of data.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to stream-based storage of data in which data placement operations are performed based on detection of different data streams within an incoming flow of data. Such operation enables the data of each data stream to be placed in a different segment of storage provided by a data storage array. Since the data from each source is kept more together, the resulting operation is more efficient, e.g., optimized sequential reads and writes, better prefetching, better auto-tiering of data, and so on.

Figure 1:
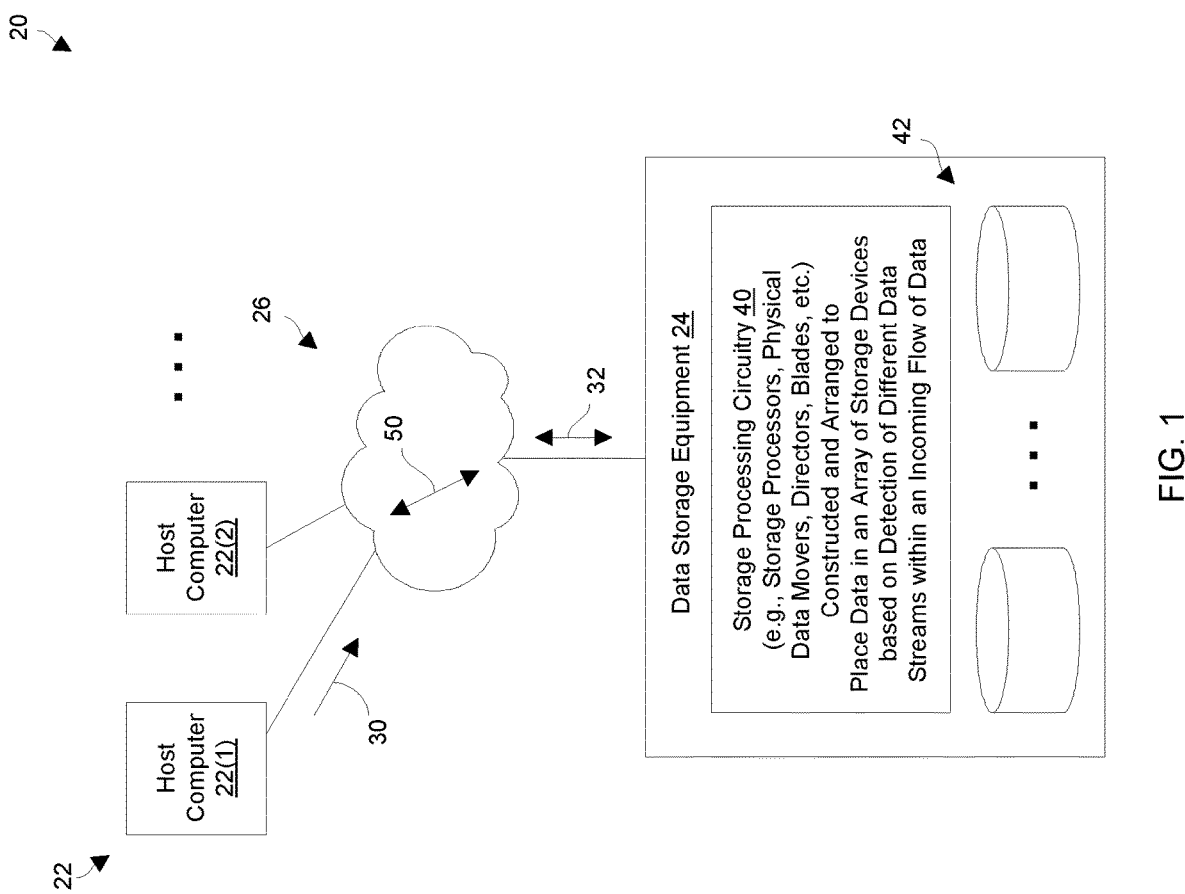
FIG. 1 is a block diagram of a data storage environment which places data based on detection of different data streams within an incoming flow of data.

FIG. 1 is a block diagram of a data storage environment 20 which places data in secondary storage based on detection of different data streams within an incoming flow of data. The data storage environment 20 includes a set of host computers 22(1), 22(2), . . . (collectively, host computers 22), data storage equipment 24, and a communications medium 26.

Each host computer 22 is constructed and arranged to perform useful work. For example, a host computer 22 may operate as a web server, a file server, an email server, an enterprise server, combinations thereof, and so on, which provides I/O requests 30 (e.g., small computer system interface or SCSI commands) to the data storage equipment 24. Such I/O requests 30 direct the data storage equipment 24 to store and retrieve host data 32 on behalf of the host computers 22.

The data storage equipment 24 includes storage processing circuitry 40 and an array of storage devices 42. The storage processing circuitry 40 may include one or more physical storage processors or engines, data movers, director boards, blades, I/O modules, storage drive controllers, switches, other hardware, combinations thereof, and so on. The storage processing circuitry 40 is constructed and arranged to provide a variety of data storage system services. For example, the storage processing circuitry 40 responds to the I/O requests 30 from the host computers 22 by robustly and reliably storing the host data 32 into and retrieving the host data 32 from the array of storage devices 42. To this end, the storage processing circuitry 40 performs data placement operations that places data within the array of storage devices 42 based on detection of different data streams within an incoming flow of data. Accordingly, the data storage equipment 24 is able to enjoy certain efficiencies and optimizations such as performing improved sequential read and write operations, better prefetching of data, smarter auto-tiering of data, and reducing write amplification within the array of storage devices 42.

The communications medium 26 is constructed and arranged to connect the various components of the data storage environment 20 together to enable these components to communicate via exchanging electronic signals 50 (e.g., see the double arrow 50). At least a portion of the communications medium 26 is illustrated as a cloud to indicate that the communications medium 26 is capable of having a variety of different topologies including backbone, hub-and-spoke, fabric, loop, irregular, combinations thereof, and so on. Along these lines, the communications medium 26 may include copper-based data communications devices and cabling, fiber optic communications devices and cabling, wireless communication devices, combinations thereof, etc. Furthermore, the communications medium 26 is capable of supporting SAN-based communications, LAN-based communications, cellular communications, WAN-based communications, distributed infrastructure communications, other topologies, combinations thereof, etc.

During operation, the storage processing circuitry 40 of the data storage equipment 24 stores host data 32 to the array of storage devices 42 and loads host data 32 from the array of storage devices 42 in response to the I/O requests 30. While doing so, the storage processing circuitry 40 detects different data streams within an incoming flow of data and performs data placement operations based on such detection. In particular, the storage processing circuitry 40 places the data of each data stream in a different segment (or predefined area) of secondary storage provided by the array of storage devices 42.

In some arrangements, at least a portion of the array of storage devices 42 provides log-based storage. That is, the storage devices 42 provide a non-volatile storage structure called a log which is divided into a series of segments of equal size. When the storage processing circuitry 40 receives enough data to write a full segment, the storage processing circuitry 40 writes that data into the next unoccupied segment. If any portion of that data had been written to an earlier-written segment, the storage processing circuitry 40 invalidates that portion of data in the earlier-written segment.

In these arrangements, the storage processing circuitry 40 provides a garbage collection service that combines or consolidates remaining valid blocks of data from partially-used segments and stores that data in new segments. Accordingly, the partially-used segments are then available for reuse.

Additionally, in some arrangements, the storage processing circuitry 40 provides a deduplication service which attempts to eliminate duplicate copies of the same data by storing a single instance of that data within array of storage devices 42. To this end, the storage processing circuitry 40 generates a digest of each data block (e.g., by applying a hash function to the data) and then, based on comparing digests, looks for matches that may signifying multiple copies of the same data. If copies of the same data are found (e.g., via a subsequent bit-by-bit comparison), the storage processing circuitry 40 eliminates the unnecessary copies and replaces them with references to the remaining copy thus saving storage space.

In some embodiments, the storage processing circuitry 40 distinguishes the digests that are generated by the storage processing circuitry 40 from other data and keeps them grouped together for efficient future access. Such grouping can be based on time (e.g., when the digests were created/stored, when the data corresponding to the digests were received, etc.) and/or based on stream (e.g., which stream does the data and thus the digests belong to, etc.). Accordingly, deduplication operations are more efficient in that the searches for matching digests is performed among a smaller (or tighter) group of digests. Further details will now be provided with reference to FIG. 2.

Figure 2:
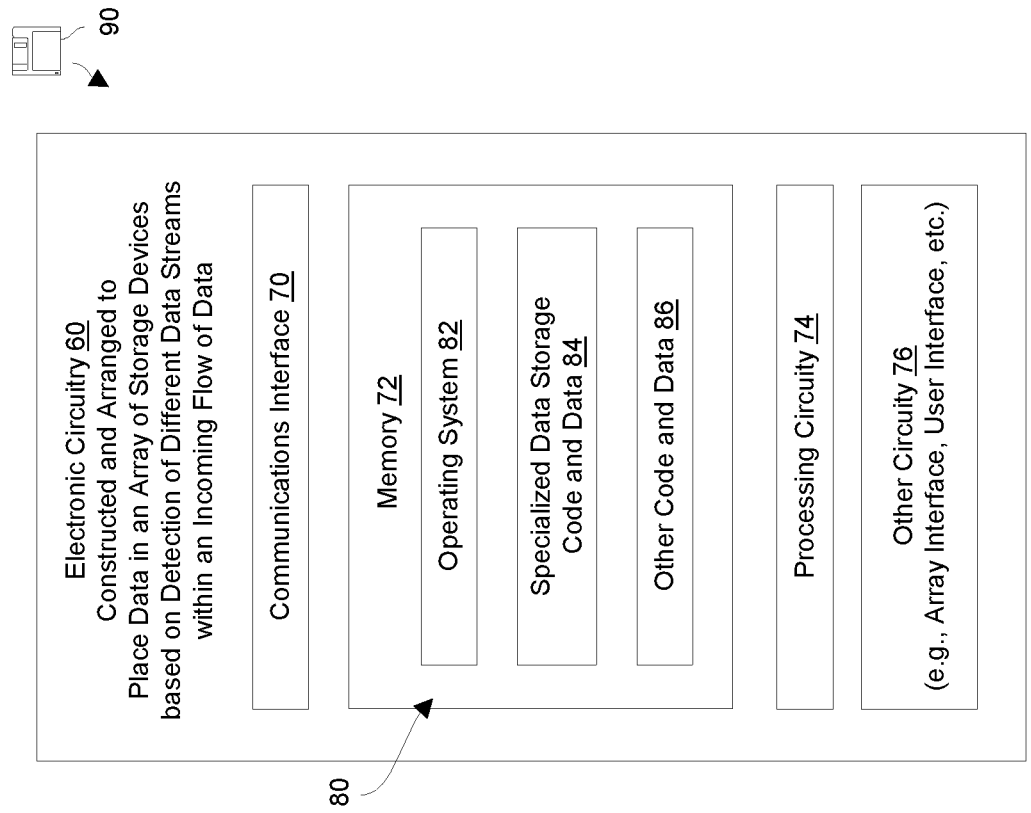
FIG. 2 is a block diagram of data storage equipment of the data storage environment of FIG. 1.

FIG. 2 shows particular details of electronic circuitry 60 which forms the storage processing circuitry 40 of the data storage equipment 24 (also see FIG. 1) that places data based on detection of different data streams in accordance with certain embodiments. As shown, the electronic circuitry 60 includes a communications interface 70, memory 72, and processing circuitry 74, and other circuitry 76.

The communications interface 70 is constructed and arranged to connect the data storage equipment 24 to the communications medium 26 (also see FIG. 1) to enable electronic communications with other devices of the data storage environment 20 (e.g., the host computers 22). Such communications may be SAN-based, IP-based, cellular-based, cable-based, fiber-optic based, wireless, cloud-based, combinations thereof, and so on. Accordingly, the communications interface 70 enables the data storage equipment 24 to robustly and reliably communicate with other apparatus.

The memory 72 is intended to represent both volatile storage (e.g., DRAM, SRAM, etc.) and non-volatile storage (e.g., flash memory, magnetic memory, etc.). In some arrangements, the memory 72 utilizes a portion of the array of storage devices 42 (FIG. 1). The memory 72 stores a variety of software constructs 80 including operating system code 82, specialized data storage code and data 84, as well as other code and data 86.

The operating system code 82 refers to an operating system which is involved in controlling various electronic resources of the data storage equipment 24. Along these lines, the operating system manages/allocates various electronic resources such as processor cycles, memory space, application installations, access control and privileges, and so on.

The data storage code and data 84 refers to the instructions that are involved in routine data storage operations (e.g., write and read operations). The data storage code 84 may include operating parameters, drivers, other metadata, etc. that form one or more portions of the I/O stack, mapping tables, and so on. In some arrangements, the data storage code 84 is tightly integrated with the operating system code 82 (e.g., a kernel).

Additionally, the data storage code and data 84 refers to specialized instructions that provides other services such as a deduplication service which is constructed and operative to deduplicate data, and a garbage collection service that coalesces valid data from partially utilized segments of storage to free up those segments of storage for reuse. In some arrangements, the specialized data storage code and data 84 further includes an index of digests that uniquely identify portions of the data (e.g., data blocks) for deduplication.

The other code and data 88 refers to various other instructions, parameters, data, etc. For example, the data storage equipment 24 may be equipped with other tools and utilities, user-level applications, and so on.

The processing circuitry 74 is constructed and arranged to operate in accordance with the various software constructs 80 stored in the memory 72. As will be explained in further detail shortly, the processing circuitry 74 executes code of the various software constructs 80 to form specialized circuitry that concurrently carries out data storage operations with smart data placement based on detection of different data streams, performs deduplication of data, performs garbage collection, and so on.

Such processing circuitry 74 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 90 is capable of delivering all or portions of the software constructs 80 to the electronic circuitry 60. In particular, the computer program product 90 has a non-transitory (or non-volatile) computer readable medium which stores a set of instructions which controls one or more operations of the electronic circuitry 60. Examples of suitable computer readable storage media include tangible articles of manufacture and apparatus which store instructions in a non-volatile manner such as CD-ROM, DVD, flash memory, disk memory, tape memory, and the like.

The other circuitry 76 represents additional hardware. For example, the other circuitry 76 (or perhaps the communications interface 70) includes circuitry that operates as a storage drive (or array) interface to communicate with the storage drives 42 (e.g., SATA, SAS, PCIe, etc.). As another example, the other circuitry 76 may include a user terminal or service processor that enables a human user to control and/or configure the data storage equipment 24, and so on. Further details will now be provided with reference to FIGS. 3 through 5.

Figure 3:
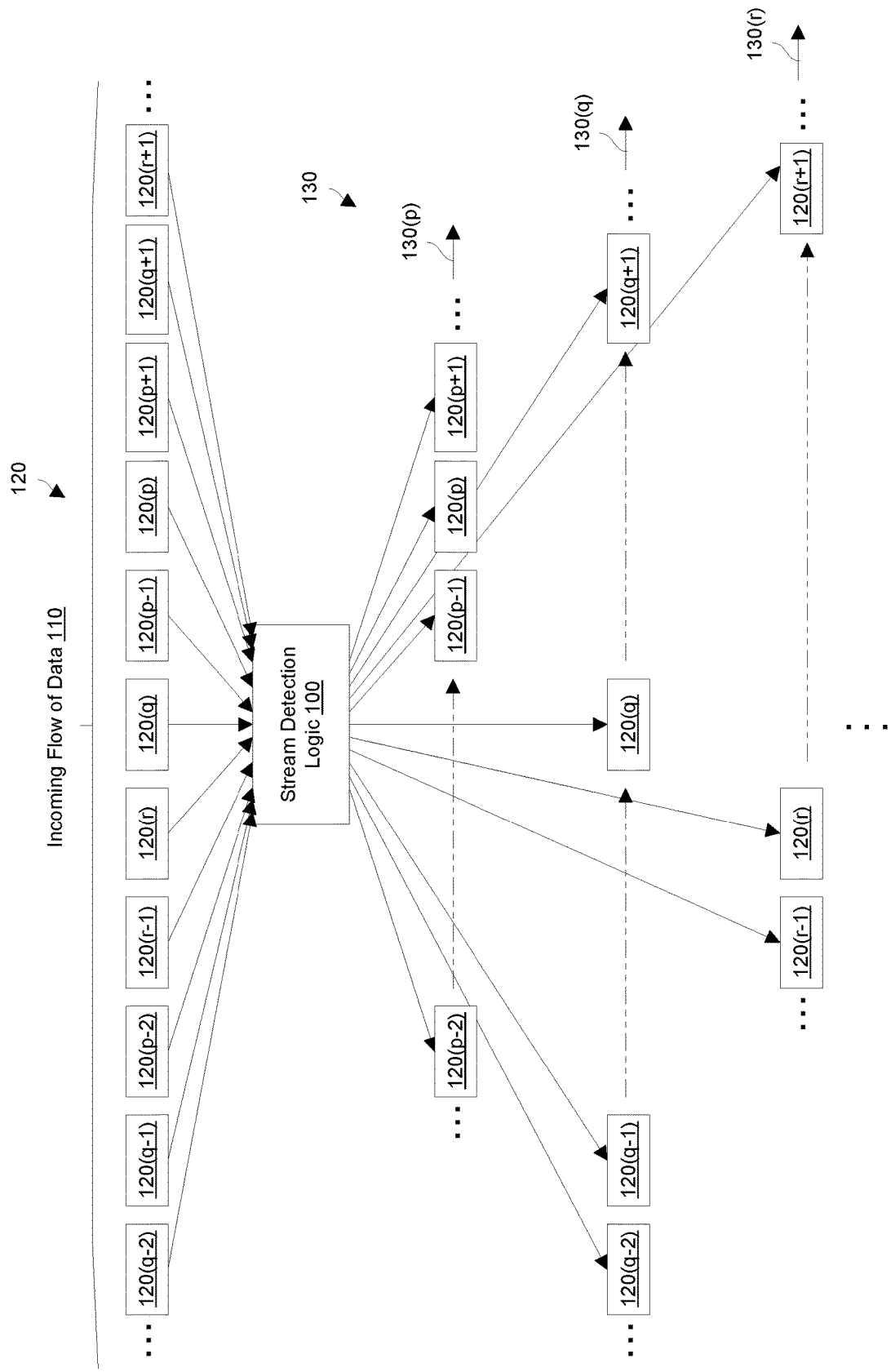
FIG. 3 is a block diagram illustrating particular details of the data placement processes in accordance with certain embodiments.
Figure 4:
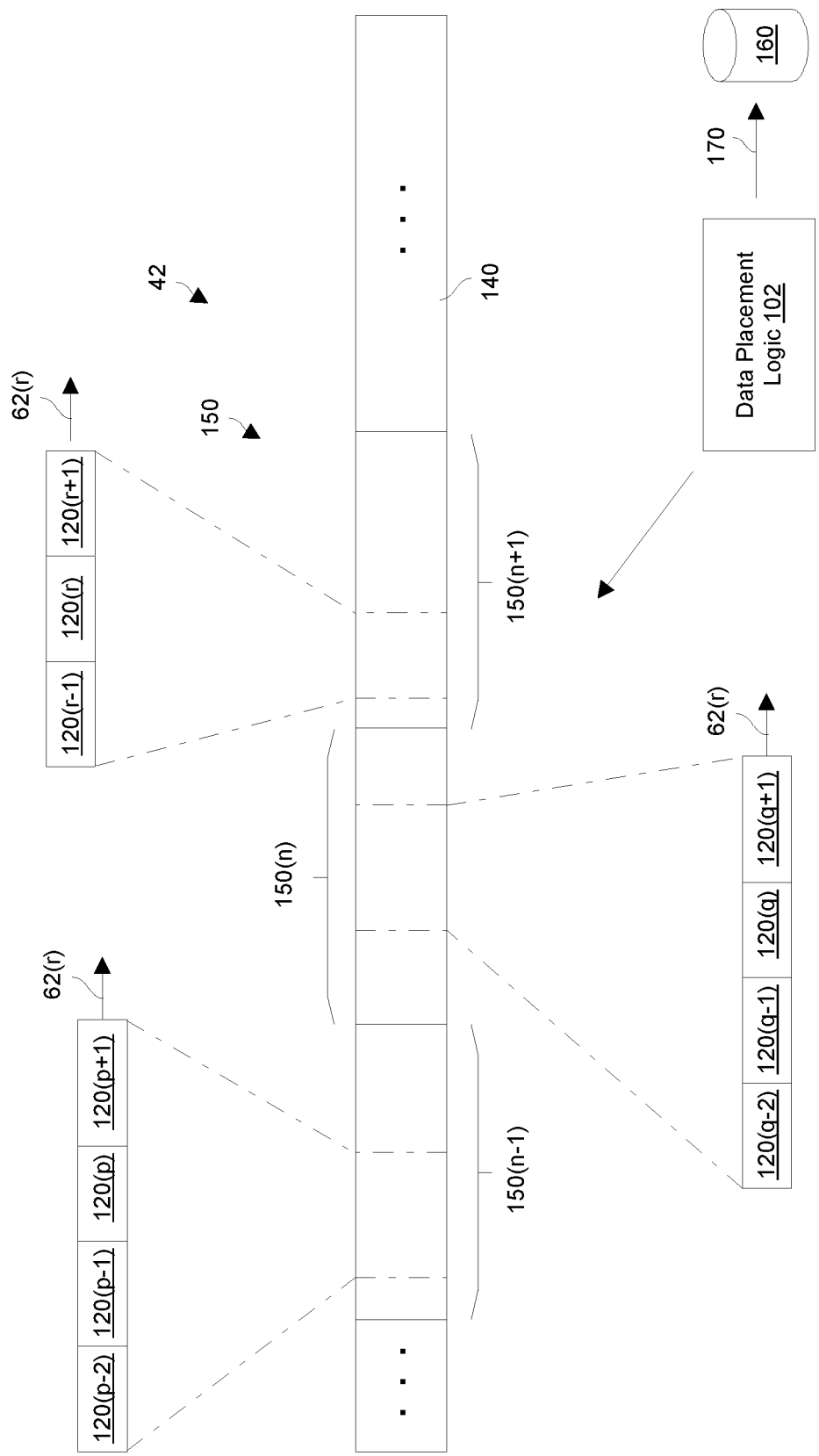
FIG. 4 is a block diagram illustrating further details of the data placement processes in accordance with certain embodiments.
Figure 5:
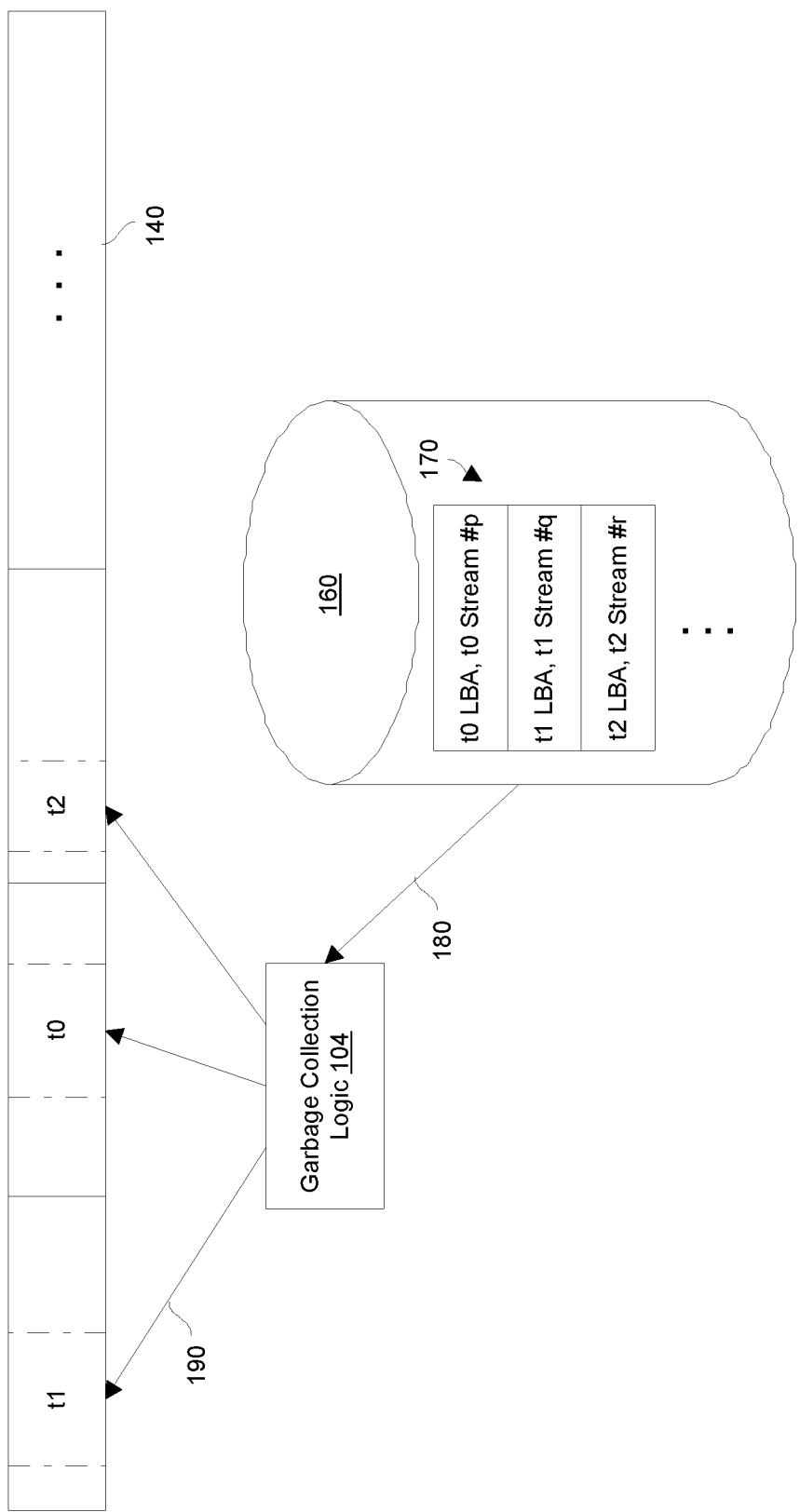
FIG. 5 is a block diagram illustrating yet further details of the data placement processes in accordance with certain embodiments.

FIGS. 3 through 5 show particular details of a data placement process as performed by the storage processing circuitry 40 (also see FIG. 1) in accordance with certain embodiments. FIG. 3 shows stream detection which is performed by stream detection logic 100 in accordance with certain embodiments. FIG. 4 shows data placement which is performed by data placement logic 102 in accordance with certain embodiments. FIG. 5 shows garbage collection activity which is performed by garbage collection logic 104 in accordance with certain embodiments. It should be understood that, in some embodiments, such logic 100, 102, and 104 may be formed by the processing circuitry 74 operating in accordance with the specialized data storage code and data 84 (also see FIG. 2).

As diagrammatically shown in FIG. 3, the stream detection logic 100 evaluates an incoming flow of data 110. In particular, the incoming flow of data 110 includes a series of data blocks 120. In some arrangements, the size of each data block 120 is the same (e.g., 8 KB, 16 KB, 32 KB, 64 KB, etc.). In other arrangements, each data block 120 may be variable in size.

During evaluation of the incoming flow of data 110, the stream detection logic 100 may detect the presence of different data streams 130($p$), 130($q$), 130($r$), . . . (collectively, data streams 130) within the incoming flow of data 110. Such operation involves identification of particular consistencies among groups of data blocks 120. Along these lines, different groups of data blocks 120 may be provided by different sources. For example, some data blocks 120 may originate from a first host computer application such as accounting software, while other data blocks 120 may originate from a second host computer application such as a word processor, and yet other data blocks 120 may originate from a third host computer application such as a database, and so on. As another example, some data blocks 120 may be provided by a first user, other data blocks 120 may be provided by a second user, and so on. As yet another example, some data blocks 120 may arrive over a first path (or connection, or port number, etc.), other data blocks 120 may arrive over a second path, etc. Other stream distinguishing criteria may be used as well as such as the type of data (e.g., regular data vs. a digest for deduplication, etc.), the format of the data, the size of the data, combinations thereof, and so on.

When the stream detection logic 100 determines that a particular data block 120 belongs to a particular data stream 130, the stream detection logic 100 may assign a unique stream identifier (ID) to that data block 120 to indicate that the data block 120 belongs to that data stream 130. In some embodiments, if the stream detection logic 100 cannot determine which stream 130 a particular data block 120 belongs to or if the stream detection logic 100 concludes that the data block 120 does not belong to any stream 130, the stream detection logic 100 either leaves the data block 120 unidentified or identifies that block 120 as belonging to a general stream 130 of data.

By way of example and as shown in FIG. 3, the stream detection logic 100 identifies blocks . . . , 120(p-2), 120(p-1), 120(p), and 120(p+1), . . . of the incoming flow of data 110 as belonging to data stream 130(p). Likewise, the stream detection logic 100 identifies blocks . . . , 120(q-2), 120(q-1), 120(q), and 120(q+1), . . . as belonging to data stream 130(q). Similarly, the stream detection logic 100 identifies blocks . . . , 120(r-1), 120(r), and 120(r+1), . . . as belonging to data stream 130(r), and so on. Next and as shown in FIG. 4, the data placement logic 102 stores the various blocks 120 of data within non-volatile secondary storage 140 provided by the array of storage devices 42. In particular, the data placement logic 102 places the respective blocks 120 of each data stream 130 in different segments (or groups of locations) 150 of the secondary storage 140 (e.g., based on assigned stream IDs). Along these lines, the data placement logic 102 places the blocks . . . , 120(p-2), 120(p-1), 120(p), and 120(p+1), . . . of the data stream 130(p) in the storage segment 150(n-1). Additionally, the data placement logic 102 places the blocks . . . , 120(q-2), 120(q-1), 120(q), and 120(q+1), of the data stream 130(q) in the storage segment 150(n). Furthermore, data placement logic 102 places the blocks . . . , 120(r-1), 120(r), and 120(r+1), . . . of the data stream 130(r) in the storage segment 150(n+1), and so on. Accordingly, each data stream 130 resides in a different segment 150 of storage.

It should be understood that the multiple storage segments . . . , 150(n-1), 150(n), 150(n+1), . . . may be the same size or different sizes. Furthermore, a variety of techniques are suitable for partitioning the storage provided by the array of storage devices 42 into the segments 150 (e.g., based on address, based on RAID group, based on RAID extent, based on device extent, etc.). In some arrangements, the various storage segments 150 are distributed across different storage tiers (e.g., a fast tier of solid state devices, a medium speed tier of SAS devices, a slow tier of near-line SAS devices, etc.).

As further shown in FIG. 4, the data placement logic 102 preserves the order of the data blocks 120 when placing the data blocks 120 within the storage segments 150. For example, the data placement logic 102 places the blocks . . . , 120(p-2), 120(p-1), 120(p), and 120(p+1), . . . of the data stream 130(p) within the segment 150(n-1) in the same order of arrival within the incoming flow of data 110 (also see FIG. 3). Such temporal order preservation leads to greater efficiency in subsequent operations (e.g., sequential reads, prefetching, promoting or demoting data to a different storage tier, etc.). Moreover, since this data (received around the same time and belonging to the same stream 130) is likely to be modified together if at all, such operation minimizes write amplification, fragmentation, garbage collection, and so on.

In some embodiments and as further shown in FIG. 5, the data placement logic 102 accesses a log 160 to capture storage details of the data placement operations. In particular, the data placement logic 102 stores, in temporal order, records 170 indicating when/where/which stream (e.g., stream ID) as well as other details regarding storage of the various blocks 120 of the streams 130 within the array of storage devices 42.

As shown in FIG. 5, the garbage collection logic 104 operates on the storage 140 provided by the array of storage devices 42. In particular, the garbage collection logic 104 combines remaining valid blocks 120 of data from partially used storage locations, and stores these valid blocks 120 in available storage locations (i.e., unused storage locations) thus improving storage efficiency and freeing the partially used storage locations for reuse.

As illustrated by the arrow 180, the garbage collection logic 104 accesses the records 170 from the log 160 to ascertain the location and order of the blocks 120 of the various data streams 130. Then, as illustrated by the arrow 190, the garbage collection logic 104 coalesces and re-places the valid blocks 120 of each stream 130 in respective storage locations keeping the blocks 120 of the individual streams 130 together in temporal order. For example, the garbage collection logic 104 combines remaining valid blocks 120 of the data stream 130(q) together and re-places them together within the storage 140 (also see FIG. 4). Similarly, the garbage collection logic 104 combines remaining valid blocks 120 of the data stream 130(q) together and re-places them together within the storage 140, and so on. As a result, blocks 120 of each stream 130 remain together in respective locations and the temporal order of the blocks 120 of each stream is preserved leading to improved efficiency in subsequent operations.

In some embodiments, the garbage collection logic 104 disables stream preservation on data after that data has sat idle or has been inactive for a predefined amount of time. For example, after the data of a first data stream 130 is placed in a first segment 150 of storage and the data of the second data stream 130 is placed in the second segment of storage 150, the garbage collection logic 104 waits for a predefined amount of time to expire. After the predefined amount of time has expired with the data remaining idle, garbage collection logic 104 provides a garbage collection service that combines and re-places the remaining valid data in the data storage array 42 regardless of the streams 130. Accordingly, at least some of the remaining valid data of the first data stream 130 and at least some of the remaining valid data of the second data stream 130 may reside together in a common segment 150 of the data storage array 42 after the amount of time has passed. Further details will now be provided with reference to FIG. 6.

Figure 6:
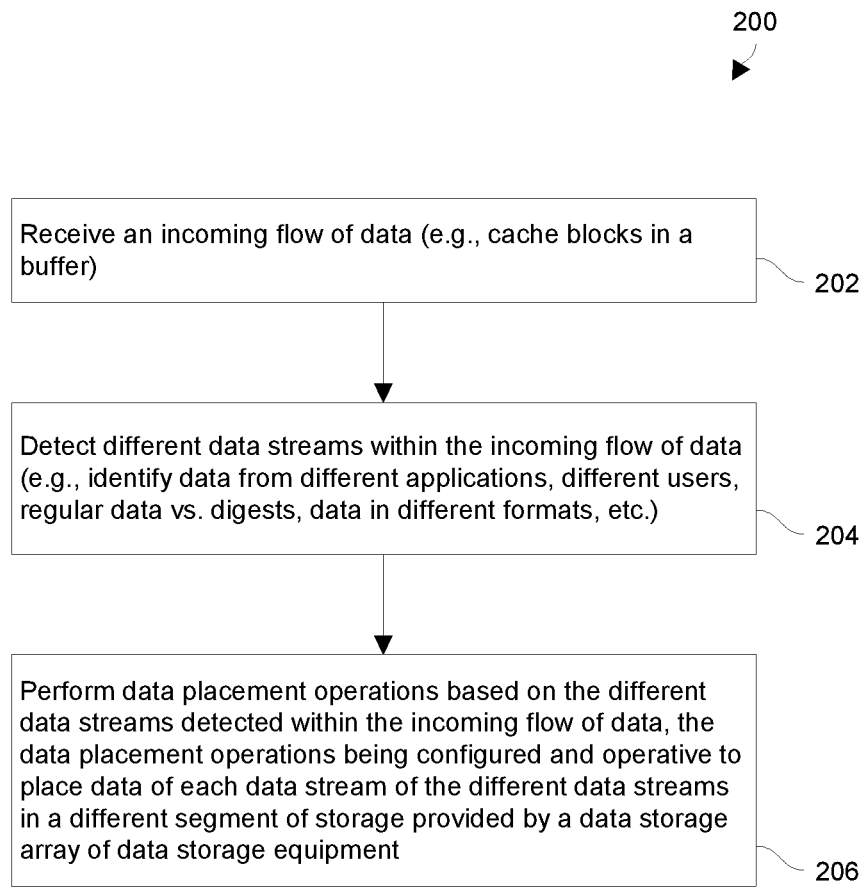
FIG. 6 is a flowchart of a procedure which is performed by the data storage equipment of FIG. 2.

FIG. 6 is a flowchart of a procedure 200 which is performed by the storage processing circuitry 40 when providing stream-based storage of data. In some embodiments, the procedure 200 is performed in an inline manner as data is processed down the I/O path and is ultimately stored in secondary storage. In other embodiments, the procedure 200 is performed in an offline manner on data that is initially stored together (e.g., quickly to acknowledge write operations with minimal latency) but then processed again based on stream to optimize future operations that utilize the data.

At 202, the storage processing circuitry 40 receives an incoming flow of data. In some arrangements, the incoming flow of data is cached in main memory for processing by the I/O path.

At 204, the storage processing circuitry 40 detects different data streams within the incoming flow of data. Here, the storage processing circuitry 40 distinguishes data from different sources such as data from different host computer applications, different users, regular data vs. digest (used in deduplication), data in different formats, and so on.

At 206, the storage processing circuitry 40 performs data placement operations based on the different data streams detected within the incoming flow of data. The data placement operations are configured and operative to place data of each data stream of the different data streams in a different segment (or area) of storage provided by a data storage array of the data storage equipment.

As described above, improved techniques are directed to stream-based storage of data in which data placement operations are performed based on detection of different data streams 130 within an incoming flow of data 110. Such operation enables the data of each data stream 130 to be placed in a different segment (or location) 150 of secondary storage 140 provided by a data storage array 42. Since the data from each source 130 is kept together, the resulting operation is more efficient, e.g., optimized sequential reads and writes, improved data prefetching, improved auto-tiering of data, and so on.

One should appreciate that the above-described techniques do not merely store data in an abstract sense. Rather, the disclosed techniques involve improvements to the technology of data storage in that such technique provide better efficiency, operation, etc. For example, the techniques improve sequential reads and prefetching. Additionally, with the data of each stream being kept together, the data can be promoted and/or demoted to different storage tier thus providing data access more commensurate for the data stream. Furthermore, since this data is received around the same time and belongs to the same stream 130, the data is likely to be modified together if at all thus minimizing write amplification, reducing fragmentation, improving garbage collection results, and so on.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the data storage environment 20 such as the host computers 22 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

One should appreciate that, at least in some situations, the ability to detect the streams 130 (e.g., determining data that is related to other data because it is part of the same user object) and then store that data preserving stream and temporal localities provides significant benefits and advantages. Along these lines, data that is ingested together will be most likely accessed together after that. If the temporal and source related data can be placed together, it will increase the access speed, improve the cache efficiency, and enable more effective inline deduplication.

In accordance with some embodiments, improved electronic circuitry identifies the different streams within the flow of incoming blocks. The blocks from the same stream are grouped together and placed in a persistent place of the same segment (or window using the CBFS terminology).

To save information about the particular stream (and temporal order within the stream) the written data belongs to, the circuitry may utilize a log of written segments (windows). Such a log keeps the record describing the segment address on the media and stream it belongs to (also see FIGS. 4 and 5). Along these lines, the records are written in the log in the temporal order. It should be understood that, in some embodiments, the log is not required because the segments are written one following the other, so the natural order of the segments on the media represents the temporal order of the data arrival.

Additionally, in some embodiments, a garbage collector processes the data in the same order grouping the active data by stream and temporal localities. Accordingly, during space reclamation, localities are preserved as well. That is, the segments with collected data follow the same rules as in initial data placement, e.g., in temporal order of the arrival. The written segments are logged as well.

Furthermore, in some embodiments, the stream ID used in placing the data on SSD supports a streaming API. Such embodiments enable reduced write amplification, and enhanced endurance at least because the related data (with related life time) are grouped together.

Also, such history is collected for remaining valid data but is disregarded or deleted after some period of inactivity. This does not reduce the efficiency of the system significantly since data tends to eventually become inactive. Accordingly, all inactive data (data that has been idle for a predefined amount of time) may be considered as belonging to a dedicated archive stream 130.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document. Such modifications and enhancements are intended to belong to various embodiments of the disclosure.

What is claimed is:

1. In data storage equipment, a method of performing stream-based storage of data, the method comprising:
   receiving, by processing circuitry of the data storage equipment, an incoming flow of data;
   detecting, by the processing circuitry, different data streams within the incoming flow of data; and
   performing, by the processing circuitry, data placement operations based on the different data streams detected within the incoming flow of data, the data placement operations being configured and operative to place data of each data stream of the different data streams in a different segment of storage provided by a data storage array of the data storage equipment;
   wherein detecting the different data streams within the incoming flow of data includes:
   evaluating the incoming flow of data, and
   based on a result of evaluating the incoming flow of data, identifying existence of multiple data stream sources that provide the different data streams;

wherein performing the data placement operations includes:
    placing the data of a first data stream in a first segment of storage, and the data of a second data stream in a second segment of storage that is different from the first segment of storage; and
wherein the method further comprises:
    prior to performing the data placement operations, forming the first segment of storage and the second segment of storage from the data storage array, each segment of storage being formed from multiple storage devices of the data storage array.

2. A method as in claim 1 wherein the data storage equipment is constructed and arranged to store host data on behalf of a set of host computers; and
    wherein identifying the existence of the multiple data stream sources includes:
        identifying a first host computer application running on the set of host computers as a data stream source that provides the first data stream, and a second host computer application running on the set of host computers as a data stream source that provides the second data stream.

3. A method as in claim 1 wherein the data storage equipment is constructed and arranged to store host data on behalf of a set of host computers; and
    wherein identifying the existence of the multiple data stream sources includes:
        identifying a first user of the set of host computers as a data stream source that provides the first data stream, and a second user of the set of host computers as a data stream source that provides the second data stream.

4. A method as in claim 1 wherein the data storage equipment is constructed and arranged to store host data on behalf of a set of host computers; and
    wherein identifying the existence of the multiple data stream sources includes:
        identifying a first data stream source and a second data stream source which is different from the first data stream source based on communications between the data storage equipment and the set of host computers.

5. A method as in claim 1, further comprising:
    generating first digests as at least some of the data of the first data stream, and second digests as at least some of the data of the second data stream,
    wherein the first digests are placed in the first segment of storage, and the second digests are placed in the second segment of storage; and
    wherein the first digests and the second digests uniquely identify respective blocks of data for deduplication.

6. A method as in claim 1 wherein placing the data of the first data stream and the second data stream includes:
    separating the incoming flow of data into the first data stream and the second data stream, and
    performing inline data placement that places the first data stream in the first segment of storage and the second data stream in the second segment of storage, each segment of storage being formed from multiple storage devices of the data storage array.

7. A method as in claim 1 wherein placing the data of the first data stream and the second data stream includes:
    storing, as the incoming flow of data, aggregated data within the data storage array, the aggregated data including the data of the first data stream and the data of the second data stream intermixed with each other, and
    performing background data placement that reads the aggregated data from the data storage array, separates the data of first data stream and the data of the second data stream from the aggregated data read from the data storage array, and places the data of the first data stream in the first segment of storage and the data of the second data stream in the second segment of storage, each segment of storage being formed from multiple storage devices of the data storage array.

8. A method as in claim 1 wherein the data of the first data stream is placed in the first segment of storage and the data of the second data stream is placed in the second segment of storage during a first time period, each segment of storage being formed from multiple storage devices of the data storage array; and
    wherein the method further comprises:
        during a second time period after the first time period, providing a garbage collection service that (i) combines valid data of the first data stream together and re-places the valid data of the first data stream in the data storage array, and (ii) combines valid data of the second data stream together and re-places the valid data of the second data stream in the data storage array, the re-placed valid data of the first data stream and the re-placed valid data of the second data stream residing in different segments of storage formed from the multiple storage devices of the data storage array.

9. A method as in claim 8, further comprising:
    during a third time period after the second time period, providing the garbage collection service which then combines remaining valid data of the first data stream and remaining valid data of the second data stream together and re-places the remaining valid data of the first data stream and the remaining valid data of the second data stream in the data storage array;
    wherein at least some of the remaining valid data of the first data stream and at least some of the remaining valid data of the second data stream reside together in a common segment of the data storage array.

10. A method as in claim 1, further comprising:
    after the data of the first data stream is placed in the first segment of storage and the data of the second data stream is placed in the second segment of storage, waiting for a predefined amount of time to expire, and
    after the predefined amount of time has expired, providing a garbage collection service that combines remaining valid data of the first data stream and remaining valid data of the second data stream together and re-places the remaining valid data of the first data stream and the remaining valid data of the second data stream in the data storage array;
    wherein at least some of the remaining valid data of the first data stream and at least some of the remaining valid data of the second data stream reside together in a common segment of the data storage array.

11. A method as in claim 1, further comprising:
    while performing the data placement operations that place the data of the first data stream in the first segment of storage and the data of the second data stream in the second segment of storage, storing addresses for the data of the first data stream and the data of the second data stream in records of a log, the records being stored in temporal order to indicate relative data arrival time.

12. A method as in claim 1 wherein, upon completion of the data placement operations, particular data of the first data stream resides in the first segment of storage and particular data of the second data stream resides in the of storage second segment during a first time period;

wherein the method further comprises:
providing a garbage collection service which re-places the particular data of the first data stream within the first segment of storage and re-places the particular data of the second data stream within the second segment of storage during a second time period which occurs after the first time period.

13. A method as in claim 12 wherein the method further comprises:

disabling stream preservation for the particular data of the first data stream and for the particular data of the second data stream; and
based on disabling stream preservation for the particular data of the first data stream and for the particular data of the second data stream, further providing the garbage collection service which re-places the particular data of the first data stream and re-places the particular data of the second data stream within a new segment of storage during a third time period which occurs after the second time period.

14. A method as in claim 13 wherein disabling stream preservation for the particular data of the first data stream and for the particular data of the second data stream includes:

disabling stream preservation for the particular data of the first data stream and for the particular data of the second data stream after the particular data of the first data stream and the particular data of the second data stream have sat idle for a predefined amount of time.

15. A method as in claim 14 wherein further providing the garbage collection service which re-places the particular data of the first data stream and re-places the particular data of the second data stream within the new segment of storage includes:

combining the particular data of the first data stream and the particular data of the second data stream within the new segment of storage.

16. Data storage equipment, comprising:
a communications interface;
memory; and
control circuitry coupled to the communications interface and the memory, the memory storing instructions which, when carried out by the control circuitry, cause the control circuitry to:
receive an incoming flow of data,
detect different data streams within the incoming flow of data, and
perform data placement operations through the communications interface based on the different data streams detected within the incoming flow of data, the data placement operations being configured and operative to place data of each data stream of the different data streams in a different segment of storage provided by a data storage array;
wherein the control circuitry, when detecting the different data streams within the incoming flow of data, is constructed and arranged to:
evaluate the incoming flow of data, and
based on a result of evaluating the incoming flow of data, identify existence of multiple data stream sources that provide the different data streams;
wherein the control circuitry, when performing the data placement operations, is constructed and arranged to:
place the data of a first data stream in a first segment of storage, and the data of a second data stream in a second segment of storage that is different from the first segment of storage; and
wherein the control circuitry is further constructed and arranged to:
prior to performing the data placement operations, form the first segment of storage and the second segment of storage from the data storage array, each segment of storage being formed from multiple storage devices of the data storage array.

17. A computer program product having a non-transitory computer readable medium which stores a set of instructions to perform stream-based storage of data; the set of instructions, when carried out by computerized circuitry, causing the computerized circuitry to perform a method of:

receiving an incoming flow of data;
detecting different data streams within the incoming flow of data; and
performing data placement operations based on the different data streams detected within the incoming flow of data, the data placement operations being configured and operative to place data of each data stream of the different data streams in a different segment of storage provided by a data storage array of data storage equipment;
wherein detecting the different data streams within the incoming flow of data includes:
evaluating the incoming flow of data, and
based on a result of evaluating the incoming flow of data, identifying existence of multiple data stream sources that provide the different data streams;
wherein performing the data placement operations includes:
placing the data of a first data stream in a first segment of storage, and the data of a second data stream in a second segment of storage that is different from the first segment of storage; and
wherein the method further comprises:
prior to performing the data placement operations, forming the first segment of storage and the second segment of storage from the data storage array, each segment of storage being formed from multiple storage devices of the data storage array.

* * * * *